United States Patent Office 2,787,527
Patented Apr. 2, 1957

2,787,527

METHOD FOR RECOVERING BORON VALUES

Martin Kilpatrick, Philadelphia, Pa., assignor to the United States of America as represented by the United States Atomic Energy Commission No Drawing. Application September 28, 1945,
Serial No. 619,266

10 Claims. (Cl. 23—205)

The present invention relates to a process for recovering boron values and more particularly for recovering boron values from the liquid by-product obtained in the thermal decomposition of a metal halide-boron trifluoride complex.

Boron trifluoride forms normally stable complexes with metal halides. A large number of these complexes are known. For example, boron trifluoride forms such complexes with calcium fluoride, sodium chloride, sodium fluoride, barium chloride, magnesium fluoride and thorium fluoride. Boron trifluoride can be regenerated from the complexes by thermally decomposing them. Commercially, such complexes may be formed, for example, in connection with chemical processes employing boron trifluoride as a catalyst. The complexes are also formed as a part of the process for separating boron isotopes disclosed in the application of Crist and Kirshenbaum Serial Number 543,502 filed July 4, 1944, and in the application of Kirshenbaum, Serial Number 575,352, filed January 30, 1945, now abandoned. In accordance with that process boron trifluoride is combined with an organic compound such as a dialkyl ether to form a complex which is then separated into fractions rich in the different boron isotopes. The organic complex is then decomposed by reaction with a metal halide which forms the metal halide-boron trifluoride complex. To recover the boron, the metal halide complex is decomposed by heating, and the evolved gaseous boron trifluoride collected and reduced to form elemental boron.

In the course of the thermal decomposition of the metal halide-boron trifluoride complex a by-product which may contain several percent of the boron originally found in the complex, distills over and condenses to liquid form. The term "liquid by-product" will be used hereinafter to identify this condensable material. The composition of the liquid by-product is not completely known but the available analytical data indicate that it is probably a mixture of products produced by the action of water on boron trifluoride. It is also possible that the mixture may contain organic complexes of boron trifluoride wherein the organic radicals are derived from the ether or other complex former used in the isotope separation process and thermal decomposition products of such complexes. Where the metal halide-boron trifluoride complex is made in the absence of organic materials, thermal decomposition also produces a liquid by-product from which boron trifluoride can be recovered by the process of the invention, although there is no possibility of the liquid in this case containing the organic fractions.

The liquid by-product has been observed to contain an average of about 7% of the total boron in the boron trifluoride-metal halide complex and at times the amount has been found to be as great as 17%. Where this boron is not recovered it represents a substantial economic loss, particularly in connection with an isotope separation process where the boron is an isotope of relatively great value.

The present invention has for an object to provide a process for the recovery of boron values from the said liquid by-product.

A particular object is to provide a process for the recovery of boron trifluoride from the said liquid by-product.

Other objects will be in part obvious and in part pointed out hereinafter.

In accordance with the present invention the liquid by-product is reacted with hydrofluoric acid and then with alkali to form an alkali fluoborate. The fluoborate is separated from the reaction mixture and decomposed to liberate boron trifluoride.

The reaction with hydrofluoric acid can be performed with either an aqueous or anhydrous hydrofluoric acid. It is preferred, however, to use aqueous hydrofluoric acid of about 48% concentration. During the reaction the mixture of acid and the liquid by-product should be cooled initially, as by means of an ice bath, and then allowed to warm to room temperature. The reaction mixture is preferably held at about room temperature for a time, usually one hour or more, to complete the reaction. The quantity of hydrofluoric acid preferably represents a substantial excess over the amount required to convert the boron in the liquid by-product to boron trifluoride.

Following the reaction with hydrofluoric acid the mixture is neutralized with an alkali, preferably potassium hydroxide, or sodium hydroxide. The alkali converts the boron trifluoride to the alkali metal fluoborate. This neutralization is strongly exothermic and the reaction mixture is preferably cooled, as by means of an ice bath. On standing, the alkali metal fluoborate crystallizes out of the mixture and can be filtered or otherwise separated off and washed. The crystalline fluoborate is then decomposed to liberate boron trifluoride.

The decomposition is accomplished by heating the fluoborate with a sulfuric acid, either concentrated sulfuric acid or fuming sulfuric acid. Decomposition may also be performed by heating the fluoborate without the addition of any other material, although this is less desirable from the standpoint of boron trifluoride yield and control of the process.

The method provides a means for recovering in the form of boron trifluoride a large percentage of the boron values in the liquid by-product. A yield of more than 70% can be obtained.

It has been found also in accordance with the invention that prior to the treatment with hydrofluoric acid a substantial portion of boron trifluoride can be removed from the liquid by-product by heating the same to a moderate temperature of the order of about 85° C. Yields of about 22% of the total boron of the liquid by-product have been obtained by the simple heating method, the product being in the form of boron trifluoride. The residue after heating can be carried through the steps previously described, namely reaction with hydrofluoric acid, neutralization to form the alkali metal fluoborate and decomposition of the latter to liberate boron trifluoride. This heating step can of course be used alone if it is not desired to resort to the other steps of the process. Where, however, the boron is of substantial value as in the case where it represents a concentration of one of the isotopes it will generally be found preferable to combine this step with the chemical treatments described above.

The following examples are illustrative of two concrete methods for practising the invention but it will be recognized that the invention is not limited to the details of these examples.

*Example 1*

The liquid by-product used was obtained in the thermal decomposition of a calcium fluoride-boron trifluoride complex which in turn had been made by reacting calcium fluoride with a boron trifluoride-dimethyl ether complex. A copper dish containing 76 grams of 48% aqueous hydrofluoric acid was placed in an ice bath and 14.5 grams of the liquid by-product slowly added. After all of the liquid by-product had been added the dish was removed from the ice bath and allowed to stand at room temperature for one hour. At the end of this time the dish was returned to the ice bath and a saturated aqueous solution of potassium hydroxide was added until the solution was alkaline to methyl orange indicator. The mixture was allowed to remain in the ice bath until the potassium fluoborate crystallized out. The crystals were separated by filtration and washed successively with portion of water, alcohol and ether. The dry potassium fluoborate was added to a large excess of concentrated sulfuric acid (about 15 parts by weight of the acid to each part of potassium fluoborate) and the mixture heated to boiling. Boron trifluoride was liberated and collected. An overall recovery of 73.9% of the boron content of the liquid by-product was observed.

Instead of using concentrated sulfuric acid, the alkali metal fluoborate can be decomposed by heating with fuming sulfuric acid. The use of fuming sulfuric acid gives a higher yield of $BF_3$ and at decomposition temperatures of about 150° C. and lower gives a purer product. If desired, the reaction with fuming sulfuric acid can be performed in two stages, the first being conducted at a temperature up to about 150° C. and the relatively pure product collected, then the residue is heated above 150° C. and a further quantity of $BF_3$ collected. The product of the second stage in the last-named process is less pure, with respect to $BF_3$, than the product of the first stage.

*Example II*

A quantity of the same type of liquid by-product as used in Example I was heated in a distillation apparatus which included a column packed with pyrex glass helices. The vapors from the top of the column were passed through a condenser followed by two traps in series, the first of which was cooled with solid carbon dioxide and the second was cooled with liquid air. The liquid was carefully heated until a liquid was observed condensing in the condenser. This occurred at a temperature of about 85° C. at the head of the column. Before this liquid distilled over a large quantity of gas had been liberated and was found to have condensed in the liquid air trap. The material in the liquid air trap was essentially boron trifluoride and it represented 22.5% (by weight) of the initial liquid by-product.

The residue was then processed as described in Example I to convert the major portion of the remaining boron to boron trifluoride.

Since many embodiments might be made of the present invention and since many changes might be made in the embodiment described, it is to be understood that the foregoing description is to be interpreted as illustrative only and not in a limiting sense.

I claim:

1. The process for recovering boron values from the liquid by-product obtained on thermally decomposing a metal halide-boron trifluoride complex, which comprises reacting the liquid by-product with hydrofluoric acid, reacting the product with an alkali to form an alkali metal fluoborate, separating the alkali metal fluoborate from the reaction mixture, and decomposing the alkali metal fluoborate to liberate boron trifluoride.

2. The process for recovering boron values from the liquid by-product obtained on thermally decomposing a metal halide-boron trifluoride complex, which comprises reacting the liquid by-product with hydrofluoric acid, reacting the product with an alkali to form an alkali metal fluoborate, separating the alkali metal fluoborate from the reaction mixture, and heating the alkali metal fluoborate with a sulfuric acid to liberate boron trifluoride.

3. The process for recovering boron values from the liquid by-product obtained on thermally decomposing a metal halide-boron trifluoride complex, which comprises reacting the liquid by-product with hydrofluoric acid, reacting the product with an alkali to form an alkali metal fluoborate, separating the alkali metal fluoborate from the reaction mixture, and heating the alkali metal fluoborate with concentrated sulfuric acid to liberate boron trifluoride.

4. The process for recovering boron values from the liquid by-product obtained on thermally decomposing a metal halide-boron trifluoride complex, which comprises reacting the liquid by-product with hydrofluoric acid, reacting the product with an alkali to form an alkali metal fluoborate, separating the alkali metal fluoborate from the reaction mixture, and heating the alkali metal fluoborate with fuming sulfuric acid to liberate boron trifluoride.

5. A process for recovering boron values from the liquid by-product obtained on thermally decomposing a metal halide-boron trifluoride complex, which comprises reacting the liquid by-product with hydrofluoric acid, reacting the product with potassium hydroxide to form potassium fluoborate, separating the potassium fluoborate from the reaction mixture, and decomposing the potassium fluoborate to liberate boron trifluoride.

6. A process for recovering boron values from the liquid by-product obtained on thermally decomposing a metal halide-boron trifluoride complex, which comprises reacting the liquid by-product with hydrofluoric acid, reacting the product with potassium hydroxide to form potassium fluoborate, and heating the potassium fluoborate with a sulfuric acid to liberate boron trifluoride.

7. A process for recovering boron values from the liquid by-product obtained on thermally decomposing a metal halide-boron trifluoride complex, which comprises reacting the liquid by-product with hydrofluoric acid, reacting the product with potassium hydroxide to form potassium fluoborate, and heating the potassium fluoborate with concentrated sulfuric acid to liberate boron trifluoride.

8. A process for recovering boron values from the liquid by-product obtained on thermally decomposing a metal halide-boron trifluoride complex, which comprises reacting the liquid by-product with hydrofluoric acid, reacting the product with potassium hydroxide to form potassium fluoborate, and heating the potassium fluoborate with fuming sulfuric acid to liberate boron trifluoride.

9. The process of claim 8 wherein the said heating step is performed at a temperature not greater than about 150° C.

10. A process for recovering boron values from the liquid by-product obtained on thermally decomposing a metal halide-boron trifluoride complex, which comprises heating the liquid by-product to liberate boron trifluoride therefrom, collecting the liberated boron trifluoride, reacting the residue of said liquid by-product with hydrofluoric acid, reacting the product with an alkali to form the alkali metal fluoborate, separating the alkali metal fluoborate from the reaction mixture, and decomposing the alkali metal fluoborate to liberate boron trifluoride.

References Cited in the file of this patent

UNITED STATES PATENTS

| | | |
|---|---|---|
| 2,374,957 | Rummelsburg | May 1, 1945 |
| 2,374,958 | Rummelsburg | May 1, 1945 |